United States Patent [19]

Hasegawa

[11] Patent Number: 4,849,926
[45] Date of Patent: Jul. 18, 1989

[54] DATA PROCESSING CIRCUIT FOR CALCULATING EITHER A TOTAL SUM OR A TOTAL PRODUCT OF A SERIES OF DATA AT A HIGH SPEED

[75] Inventor: Kenji Hasegawa, Tokyo, Japan
[73] Assignee: NEC Corporation, Tokyo, Japan
[21] Appl. No.: 177,840
[22] Filed: Mar. 28, 1988

Related U.S. Application Data

[63] Continuation of Ser. No. 753,611, Jul. 10, 1985, abandoned.

[30] Foreign Application Priority Data

Jul. 11, 1984 [JP] Japan ............... 59-143579

[51] Int. Cl.$^4$ ............................................. G06F 9/00
[52] U.S. Cl. ........................ 364/900; 364/931.4; 364/931; 364/948.3
[58] Field of Search ......................... 364/200, 900

[56] References Cited

U.S. PATENT DOCUMENTS

| | | | |
|---|---|---|---|
| 3,673,399 | 6/1972 | Hancke et al. | 364/726 |
| 3,875,391 | 4/1975 | Shapiro et al. | 364/200 |
| 4,128,880 | 12/1978 | Croy, Jr. | 364/200 |
| 4,298,936 | 11/1981 | Shapiro | 364/200 |
| 4,405,992 | 9/1983 | Blau et al. | 364/748 |
| 4,484,259 | 11/1984 | Palmer et al. | 364/754 |
| 4,490,786 | 12/1984 | Nakatani | 364/200 |
| 4,546,446 | 10/1985 | Machida | 364/759 |
| 4,589,067 | 5/1986 | Porter et al. | 364/200 |
| 4,651,274 | 3/1987 | Omoda et al. | 364/200 |

*Primary Examiner*—Gareth D. Shaw
*Assistant Examiner*—John G. Mills
*Attorney, Agent, or Firm*—Foley & Lardner, Schwartz, Jeffery, Schwaab, Mack, Blumenthal & Evans

[57] ABSTRACT

In a data processing circuit for calculating a total sum of a succession of data in a pipeline fashion, an arithmetic unit (28) carries out an addition iteratively on the data to produce intermediate results of addition. Work registers (31, 32), equal in number to the number of the pipeline stages, successively temporarily stores the intermediate results. Specifying circuit (35) cyclically specifies the work registers as specified registers to store the intermediate results in the specified registers in the pipeline fashion. Selector (33) selects each of the work registers as a selected register to supply the arithmetic unit with the intermediate result stored in the selected register. When the arithmetic unit carries out the addition on all the data, contents of the work registers are added to each other by the use of the arithmetic unit to provide an ultimate result representative of the total sum.

5 Claims, 5 Drawing Sheets

REGISTER 21, 22: 1 | 2 | 3 | 4 | 5 | 6
25, 26: 1 | 2 | 3 | 4 | 5
29: 1 | 2 | 3 | 4

REGISTER 21, 22: 1 | 2 | 3
25, 26: 1 | 2 | 3

1T 2T 3T 4T 5T 6T

FIG. 3  PRIOR ART

DATA PROCESSING CIRCUIT FOR CALCULATING EITHER A TOTAL SUM OR A TOTAL PRODUCT OF A SERIES OF DATA AT A HIGH SPEED

This application is a continuation of application Ser. No. 753,611, filed July 1, 1985 now abandoned.

BACKGROUND OF THE INVENTION

This invention relates to a data processing circuit for use in calculating either a total sum or a total product of a series of data.

The data processing circuit is used in carrying out calculation of a predetermined one of a total sum and a total product of a plurality of vector data or vector elements which are designated by a vector instruction.

As will later be described with reference to three of several figures of the accompanying drawing, a data processing circuit of the type described may comprise an operand producing section which is responsive to a series of data, such as vector elements, and which successively produces operands two of which will be called a first and a second operand, respectively. The operand producing section is operable on a plurality of pipeline stages. The pipeline stages are carried out under pipeline control of operation of the data processing circuit to carry out the total sum at a high speed. An arithmetic unit successively carries out a local calculation of a local sum of the first and the second operands to produce a local or intermediate result representative of the local sum. The intermediate result is successively delivered as the first operand through the pipeline stages while the data are delivered as the second operand through the pipeline stages.

In the data processing circuit, the intermediate result related to one vector element and a next following vector element are synchronously delivered to the arithmetic unit as the first and the second operands, respectively. That is to say, supply of the next vector element to the operand producing section is postponed or delayed until the intermediate result is calculated by the arithmetic unit for the above-mentioned one vector element. Such a delay time results in an undesiredly slow calculation speed of the data processing circuit. Thus, the calculation speed of data processing circuit is inevitably reduced on calculating the total sum of the series of data.

SUMMARY OF THE INVENTION

It is an object of the invention to provide a data processing circuit which is capable of calculating either a total sum or a total product of a series of data at a high speed.

According to this invention, there is provided a data processing circuit comprising calculation carrying out means responsive to a succession of data for carrying out a predetermined calculation iteratively on the data of the succession to provide intermediate results of calculation, a predetermined number of work registers for successively temporarily storing the results of calculation, and administrating means for administrating the work registers to cyclically transfer the intermediate results among the work registers and the calculation carrying out means in a pipeline fashion.

BRIEF DESCRIPTION OF THE DRAWING

FIG. 2 is a time chart for use in describing the conventional data processing circuit;

FIG. 3 is another time chart for use in describing the conventional data processing circuit;

DESCRIPTION OF THE PREFERRED EMBODIMENTS

Figure 1:
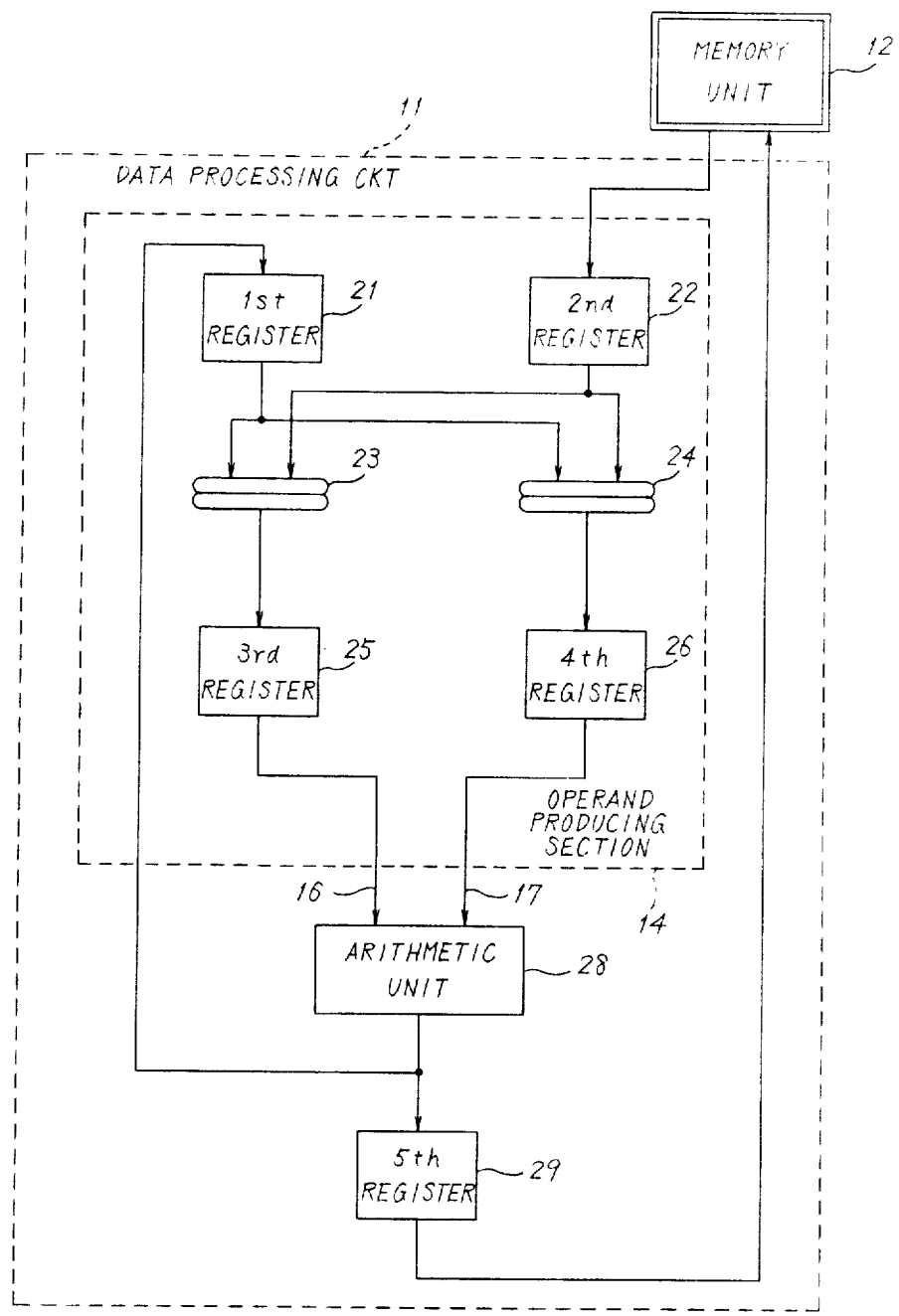
FIG. 1 shows in blocks, together with a memory unit, a conventional data processing circuit.

Referring to FIG. 1, a conventional data processing circuit 11 will be described at first for a better understanding of this invention. The data processing circuit 11 is for use in a data processing system which comprises a memory unit 12 coupled to the data processing circuit 11. The memory unit 12 stores various instructions, such as vector instructions and scalar instructions, for carrying out a wide variety of calculations. The memory unit 12 also stores data, such as vector elements, which should be calculated by the data processing circuit 11. An instruction decoder (not shown) is operatively coupled to the data processing circuit 11 and the memory unit 12. The instruction decoder is responsive to the instruction read out of the memory unit 12 and decodes the instruction to provide various command signals, such as an arithmetic command signal. The arithmetic command signal indicates an arithmetic operation which should be carried out.

The data processing circuit 11 serves to carry out a predetermined calculation designated by the arithmetic command signal. The predetermined calculation is carried out on a series of data which are successively read out of the memory unit 12 by the data processing circuit 11.

The data processing circuit 11 comprises an operand producing section 14 which is successively responsive to the data series and which produces first and second operands 16 and 17. The operand producing section 14 comprises a first register 21 which is capable of storing data in accordance with a request of software to produce a first output signal representative of the data stored therein. The operand producing section 14 further comprises a second register 22 which is responsive to readout data from the memory unit 12 and which temporarily stores the readout data to produce a second output signal representative of the data stored therein. A first selector 23 selects one of the first and the second output signals in response to the first and the second output signals to produce a first selected signal. A second selector 24 is responsive to the first and the second output signals and selects one of the first and the second signals to produce a second selected signal. Responsive to the first selected signal, a third register 25 stores the first selected signal to produce the first operand 16 representative of the first selected signal stored therein.

Likewise, a fourth register 26 is responsive to the second selected signal and stores the second selected signal to produce the second operand 17 representative of the second selected signal stored therein.

An arithmetic unit 28 is responsive to the first and second operands 16 and 17 and the arithmetic command signal and successively carries out a local calculation of the predetermined calculation designated by the arithmetic command signal to calculate a selected one of a local sum and a local product of the first and the second operands and to produce an intermediate result representative of either the local sum or the local product. The arithmetic unit 28 finally produces an ultimate result of the predetermined calculation. Thus, the arithmetic unit 28 is operable as a calculation carrying out section which is responsive to a succession of data and which carries out a predetermined calculation iteratively on the data of the succession to provide intermediate results of calculation.

The intermediate result is successively delivered to the first register 21. A fifth register 29 is capable of storing the ultimate result in accordance with the request of software to produce writing data which are representative of the ultimate result and which are to be memorized into the memory unit 12. The ultimate result may be stored either in the first register 21 or in the fifth register 29 in accordance with the request of software.

The data processing circuit 11 is operable in a pipeline fashion through a plurality of pipeline stages which are composed, for example, of first and second pipeline stages. The first pipeline stage is carried out by the first and the second registers 21 and 22. The second pipeline stage is dealt with by the third and the fourth registers 25 and 26. Such a plurality of pipeline stages are for carrying out the predetermined calculation at a high speed.

With this structure, one machine cycle is necessary in storing a content of either he first register 21 or the second register 22 into either the third register 25 or the fourth register 26 through either the first selector 23 or the second selector 24. In addition, another machine cycle is indispensable on carrying out the local calculation on contents of the third and the fourth registers 25 and 26 in the arithmetic unit 28 and in storing the local or intermediate result into either the first register 21 or the fifth register 29.

The content of the first register 21 will be represented by R. Vector elements stored in the memory unit 12 will be represented by $V_i$ ($i = 1, 2, \ldots$). Vector elements having different suffixes are stored into the memory unit 12 with different addresses of the memory unit 12 assigned thereto.

Referring to FIG. 2 afresh and FIG. 1 again, operation of the data processing circuit 11 will now be described as regards a case where a scalar instruction is an instruction to be executed. It will be assumed that the scalar instruction has a sequence of partial instructions as follows.

1st partial instruction: $V_1 + R \rightarrow V_1$,

2nd partial instruction: $V_2 + R \rightarrow V_2$,

3rd partial instruction: $V_3 + R \rightarrow V_3$,

. . . , and n-th partial instruction: $V_n + Rn \rightarrow V_n$.

where R represents initial value. In FIG. 2, a machine cycle is represented by T. Data used in execution of the first through the n-th partial instructions are indicated by numerals 1 through n, respectively.

In a first machine cycle 1T, the initial value R and a first scalar data $V_1$ are stored in the first and the second registers 21 and 22, respectively.

In a second machine cycle 2T, the initial value R and the first scalar data $V_1$ are stored in the third and the fourth registers 25 and 26, respectively. Simultaneously in the second machine cycle 2T, the initial value R and a second scalar data $V_2$ are stored in the first and the second registers 21 and 22, respectively.

In a third machine cycle 3T, a first sum of the initial value R and the first scalar data $V_1$ is calculated by the arithmetic unit 28 and is stored in the fifth register 29. Simultaneously in the third machine cycle 3T, the initial value R and the second scalar data $V_2$ are stored in the third and the fourth registers 25 and 26, respectively. The initial value R and a third scalar data $V_3$ are stored in the first and the second registers 21 and 22, respectively.

In a fourth machine cycle 4T, a second sum of the initial value R and the second scalar data $V_2$ is stored in the fifth register 29 like in the third machine cycle 3T.

Thus, each of first through n-th sums is sequentially stored in the fifth register 29. That is to say, it is possible to define an execution cycle of each partial instruction as one machine cycle. In other words, it is possible to execute the scalar instruction under pipeline control of operation of the data processing circuit 11 at a high speed. As illustrated in FIG. 2, the fifth register 29 is successively loaded with each sum at every machine cycle without any waiting or inactive machine cycle. This shows that an average processing time of each instruction becomes approximately equal to one of the machine cycles when a plurality of instructions are successively processed in the pipeline fashion.

However, instructions do not always consist of such instructions which can be processed in the pipeline fashion. The pipeline control is often disturbed and delayed by the presence of branch instructions, iterative calculation instructions, and the like. The iterative calculation instructions may be exemplified by vector instructions. When such vector instructions are successively carried out in the pipeline fashion by the use of the data processing unit 11, the fifth register 29 is not successively loaded with each sum at every machine cycle, which results in disturbance of the pipeline control, as will later be described.

Referring to FIG. 3 afresh and again to FIG. 1, operation of the data processing circuit 11 will now be described as regards another case where a vector instruction is an instruction to be executed. The vector instruction is an instruction which is for calculating a total sum of a plurality of vector elements, n in number, and is for storing the total sum in either the first register 21 or the fifth register 29. That is to say, the vector instruction is represented by Formula (1) hereunder:

$$R + \sum_{i=1}^{n} V_i \rightarrow R$$

The vector instruction has a sequence of arithmetic steps as follows.

1st step $R + V_1 \rightarrow R_1$,

2nd step $R_1 + V_2 \rightarrow R_2$,

. . . , and n-th step $R_{n-1} + V_n \rightarrow R_n$, where R represents an initial value. In FIG. 3, a machine cycle is again represented by T. Data flows used in execution of the first through the n-th steps are indicated by numerals 1 through n, respectively.

In a first machine cycle 1T, the initial value R and a first vector element $V_1$ are stored in the first and the second registers 21 and 22, respectively.

In a second machine cycle 2T, the initial value R and the first vector element $V_1$ are stored in the third and the fourth registers 25 and 26, respectively.

In a third machine cycle 3T, a first local sum of the initial value R and the first vector element $V_1$ is calculated by the arithmetic unit 28. A first intermediate result $R_1$ representative of the first local sum is stored in the first register 21. Simultaneously in the third machine cycle 3T, a second vector element $V_2$ is stored in the second register 22.

In a fourth machine cycle 4T, the first intermediate result $R_1$ and the second vector element $V_2$ are stored in the third and the fourth registers 25 and 26, respectively.

In a fifth machine cycle 5T, a second local sum of the first intermediate result $R_1$ and the second vector element $V_2$ is calculated by the arithmetic unit 28. A second intermediate result $R_2$ representative of the second local sum is stored into the first register 21. Simultaneously in the fifth machine cycle 5T, a third vector element $V_3$ is stored in the second register 22.

Thus, an ultimate result $R_n$ representative of the total sum $(R_{n-1} + V_n)$ is stored in either the first register 21 or the fifth register 29.

It is to be noted in connection with the above that the intermediate result related to one vector element and a next following vector element are synchronously stored in the first and the second registers 21 and 22, respectively. Inasmuch as supply of the next vector element to the operand producing section 14 is postponed or awaited until the intermediate result is calculated by the arithmetic unit 28 for the above-mentioned one vector element, two machine cycles are indispensable as an execution cycle which is for executing an arithmetic operation on each vector element. Due to such a waiting time for the supply of the next vector element, the data processing circuit 11 undesiredly has a slow calculation speed. When the number of the pipeline stages is represented by m, the waiting time is substantially equal to (m−1) machine cycles. Thus, the data processing circuit 11 is incapable of calculating the ultimate sum of the series of the vector elements at a high speed.

Consideration will be given to the reason why such a waiting time or an inactive machine cycle occurs on processing the vector instructions. For this purpose, let the first and the second registers 21 and 22 be used in a first one of the pipeline stages. Likewise, let the third and the fourth registers 25 and 26 and the fifth register 29 be used in second and third ones of the pipeline stages, respectively. In this event, the fifth register 29 is used not only in the third pipeline stage, but also in the first pipeline stage so as to carry out the above-mentioned iterative calculation. As a result, the waiting time inevitably occurs during the pipeline control.

Principles of the invention will now be described. When a vector instruction is represented by Formula (1) mentioned before, the vector instruction is processed according to a process which is represented by a similar formula (2) hereunder:

$$R + V_1 + V_2 + V_3 + V_4 + \ldots + V_n \rightarrow R \quad (2)$$

Figure 4:
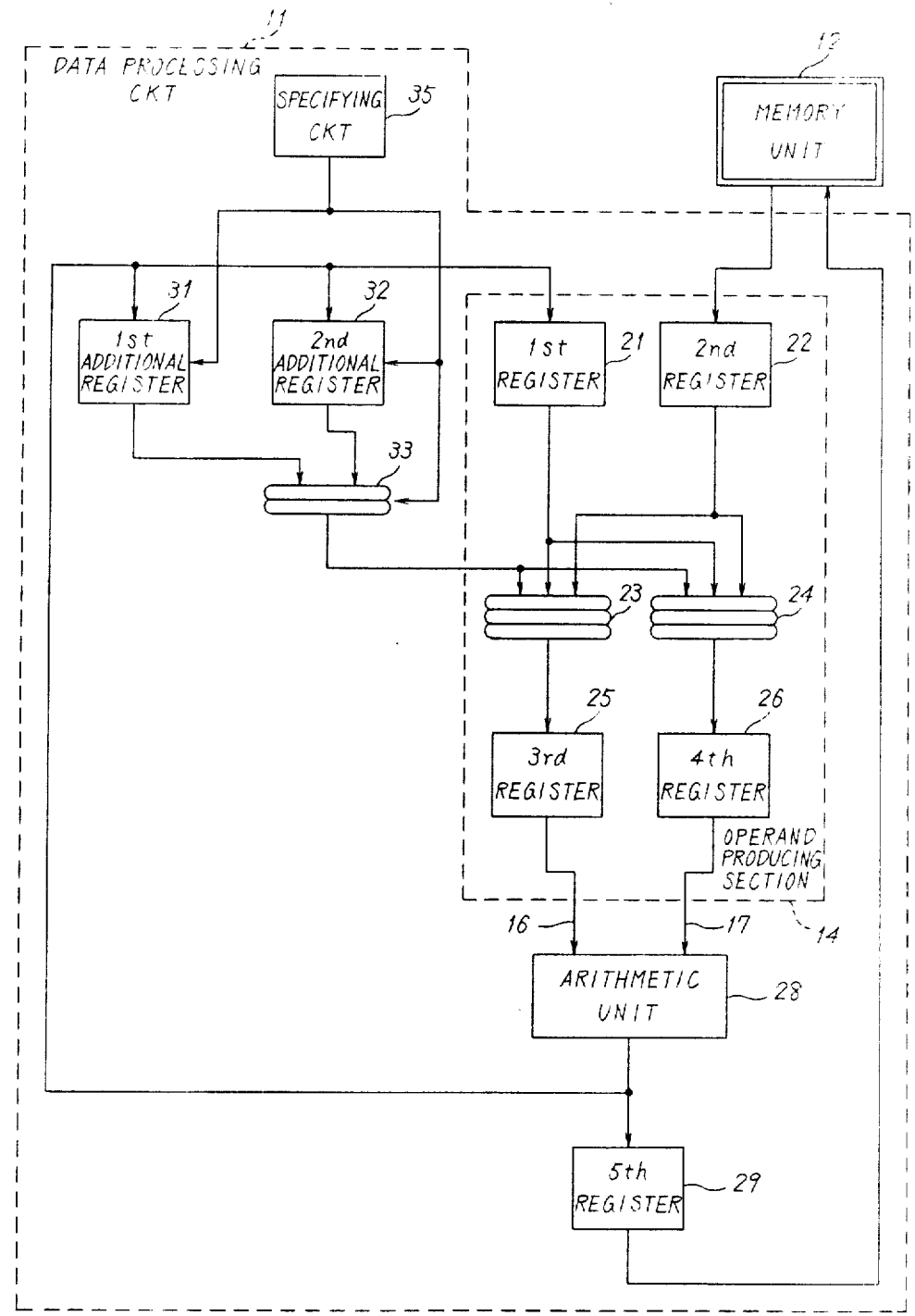
FIG. 4 shows in blocks, together with a memory unit, a data processing circuit according to a first embodiment of this invention.

If the operand producing section 14 has, for example, two pipeline stages in the manner illustrated in FIG. 1, this invention executes the vector instruction in accordance with arithmetic steps as follows.

$$\left. \begin{array}{l} V_1 + V_3 + \ldots + V_{n'} \rightarrow WR_1 \\ V_2 + V_4 + \ldots + V_{n''} \rightarrow WR_2 \\ R + WR_1 + WR_2 \rightarrow R \end{array} \right\} \quad (3)$$

where n′=n−1 and n″=n when n is an even number and n′=n and n″=n−1 when n is an odd number. In addition, $WR_1$ and $WR_2$ represents values of first and second partial sum, respectively. Even if the vector instruction is executed in accordance with the arithmetic steps given by Formulae (3), it is possible to obtain the same ultimate result as the data processing circuit illustrated in FIG. 1. If the number of pipeline stages is equal to m in the operand producing section 14, this invention executes the vector instruction in accordance with arithmetic steps as follows.

$$\left. \begin{array}{l} V_1 + V_{m+1} + \ldots + V_{k(1)} \rightarrow WR_1, \\ V_2 + V_{m+2} + \ldots + V_{k(2)} \rightarrow WR_2, \\ \cdot \\ \cdot \\ \cdot \\ V_m + V_{2m} + \ldots + V_{k(m)} \rightarrow WR_m, \\ R + WR_1 + WR_2 + \ldots + WR_m \rightarrow R. \end{array} \right\} \quad (4)$$

where $k(i) = m \times [n/m] + i$ ($i \leq nMODm$), $k(i) = m \times ([n/m] - 1) + i$ ($i > nMODm$).

when [ ] represents the Gauss' notation and MOD represents a modulo arithmetic. In addition, $WR_m$ represents a value of an m-th partial sum. Referring to FIG. 4, a data processing circuit according to a first embodiment of this invention comprises similar parts designated by like reference numerals. First and second additional registers 31 and 32 are coupled to the arithmetic unit 28. The first and the second additional registers 31 and 32 are operable as first and second work registers which are for successively temporarily storing the intermediate results calculated by the arithmetic unit 28. The first and the second registers 21 and 22 and the work registers 31 and 32 are simultaneously operable in one machine cycle.

A third selector 33 is coupled to the first and the second work registers 31 and 32. The third selector 33 is for selecting each of the first and the second work registers 31 and 32 as a selected register to supply the arithmetic unit 28 through the operand producing section 14 with the intermediate result stored in the selected register.

The first selector 23 is responsive to the first and the second output signals given from the first and the second registers 21 and 22 and to the intermediate result given from the third selector 33. The first selector 23 selects one of the first and the second signals and the intermediate result to produce a first selected signal. Likewise, the second selector 24 selects one of the first and the second signals and intermediate result to produce a second selected signal.

A specifying circuit 35 is for sequentially and cyclically specifying one of the work registers 31 and 32 as a specified register to provide the specified register with a set command signal which is for making the specified register store the intermediate result. The specifying circuit 35 sequentially specifies the work registers 31 and 32 one at a time, as the specified register every one machine cycle. Consequently, the first work register 31 is supplied with a succession of every other one of the intermediate results while the second work register 32 is supplied with the remaining intermediate results. When the specifying circuit 35 provides the specified work register with the set command signal, the specifying circuit 35 also provides the remaining work register with a select command signal which is for making the third selector 33 select that remaining work register as the selected register which is different from the specified work register. As a result, the first and the second work registers 31 and 32 are alternately selected as the selected register by the third selector 33.

Figure 5:
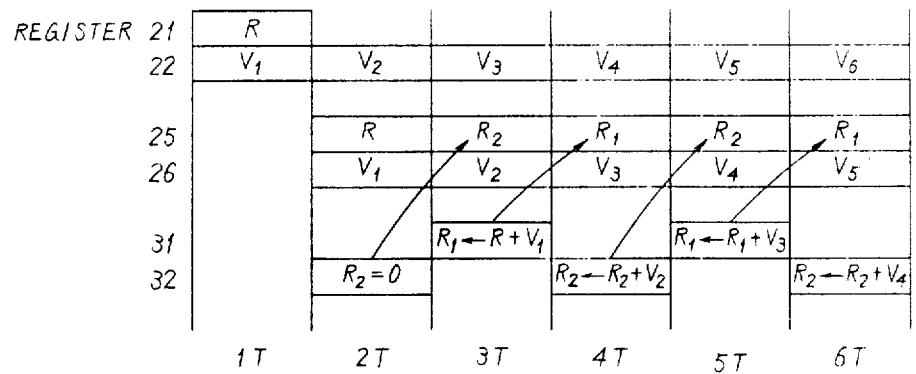
FIG. 5 is a time chart for use in describing the data processing circuit according to the first embodiment of this invention.

Referring to FIG. 5 afresh and FIG. 4 again, operation of the data processing circuit 11 will now be described as regards a case where an instruction to be executed is the vector instruction which is represented by Formula (1) described before. The vector instruction is executed in accordance with a sequence of arithmetic steps as follows.

$$\left.\begin{array}{l}(R_2 = 0), \\ (R) + (V_1) \rightarrow R_1, \\ (R_2) + (V_2) \rightarrow R_2, \\ (R_1) + (V_3) \rightarrow R_1, \\ (R_2) + (V_4) \rightarrow R_2, \\ \cdot \\ \cdot \\ \cdot \\ (R_2) + (V_n) \rightarrow R_2, \\ \text{and} \quad (R_1) + (R_2) \rightarrow R, \end{array}\right\} \quad (5)$$

where R, $R_1$, and $R_2$ represent the registers 21, 31, and 32, respectively, and ( ) represents a content of each of the registers. In FIG. 5, a machine cycle is again represented by T.

In a first machine cycle 1T, an initial value R and a first vector element $V_1$ are stored in the first and the second registers 21 and 22, respectively, in a known manner.

In a second machine cycle 2T, the initial value R and the first vector element $V_1$ are stored in the third and the fourth registers 25 and 26 through the first and the second selector 23 and 24, respectively. Simultaneously in the second machine cycle 2T, a second vector element $V_2$ is stored in the second register 22.

At the same time, another initial value $R_2 = 0$ is stored in the second work register 32 under control of software.

In a third machine cycle 3T, a first local sum of the initial value R and the first vector element $V_1$ is calculated by the arithmetic unit 28. A first intermediate result $(R + V_1)$ representative of the first local sum is stored in the first work register 31, namely, an $R_1$ register. Simultaneously in the third machine cycle 3T, a third vector element $V_3$ is stored in the second register 22. At the same time, the other initial value $R_2 = 0$ is stored in the third register 25 through the third and the first selectors 33 and 23. The second vector element $V_2$ is stored in the fourth register 26 through the second selector 24.

In a fourth machine cycle 4T, a second local sum of the other initial value $R_2 = 0$ and the second vector element $V_2$ is calculated by the arithmetic unit 28. A second intermediate result $(R_2 + V_2)$ representative of the first local sum is stored in the second work register 32, namely, an $R_2$ register. Simultaneously, a fourth vector element $V_4$ is stored in the second register 22. At the same time, the first intermediate result $(R + V_1)$ and the third vector element $V_3$ are stored in the third and the fourth registers 25 and 26, respectively. Thus, it is possible to carry out each of calculations $$R + V_1 \rightarrow R_1,$$

$$R_2 + V_2 \rightarrow R_2,$$

$$R_1 + V_3 \rightarrow R_1,$$

$$\cdots$$

$$\text{and } R_2 + V_n \rightarrow R_2$$

every one machine cycle.

After calculation is carried out as regards a final vector element $V_n$, a calculation of $R_1 + R_2 \rightarrow R$ is carried out in a manner described below.

At first, the third selector 33 selects the first work register 31 as a selected register by operation of the specifying circuit 35. As a result, a first content ($R_1$) of the first work register 31 is sent to the operand producing section 14 through the third selector 33. Then, the first content ($R_1$) is stored in the first register 21 through the first selector 23, the third register 25, and the arithmetic unit 28.

Subsequently, the third selector 33 selects the second work register 32 as the selected register by operation of the specifying circuit 35. As a result, a second content ($R_2$) of the second work register 32 is sent to the operand producing section 14 through the third selector 33. Then, the second content ($R_2$) is stored in the third register 25 through the first selector 23. In this event, the first content ($R_1$) stored in the first register 21 is sent to the fourth register 26 through the second selector 24. Then, an ultimate result ($R_1 + R_2$) is calculated by the arithmetic unit 28. The ultimate result is stored in the first register 21, namely, the R register. Thus, a calculation of $$R + \sum_{i=1}^{n} V_i \rightarrow R$$

is carried out.

Inasmuch as an execution cycle of each vector element is substantially equal to one machine cycle on calculating a total sum of a series of vector elements, it is possible to calculate the total sum at a high speed.

As mentioned before, a combination of the specifying circuit 35 and the third selector 33 is operable as an administrating part for administrating the work registers 31 and 32 to cyclically transfer the intermediate results among the work registers 31 and 32 and the arithmetic unit 28 in a pipeline fashion through the third register 25.

If the number m of pipeline stages is greater than two in the operand producing section 14, it is necessary to render the number of work registers substantially equal to the number m of the pipeline stages. In such a case, the data processing circuit 11 executes the vector instruction represented by Formula (1) in accordance with the arithmetic steps represented by Formulae (4). An ultimate result is obtained by adding contents $WR_1$, ..., and $WR_m$ of all work registers like in the data processing circuit 11 illustrated in FIG. 4.

Figure 6:
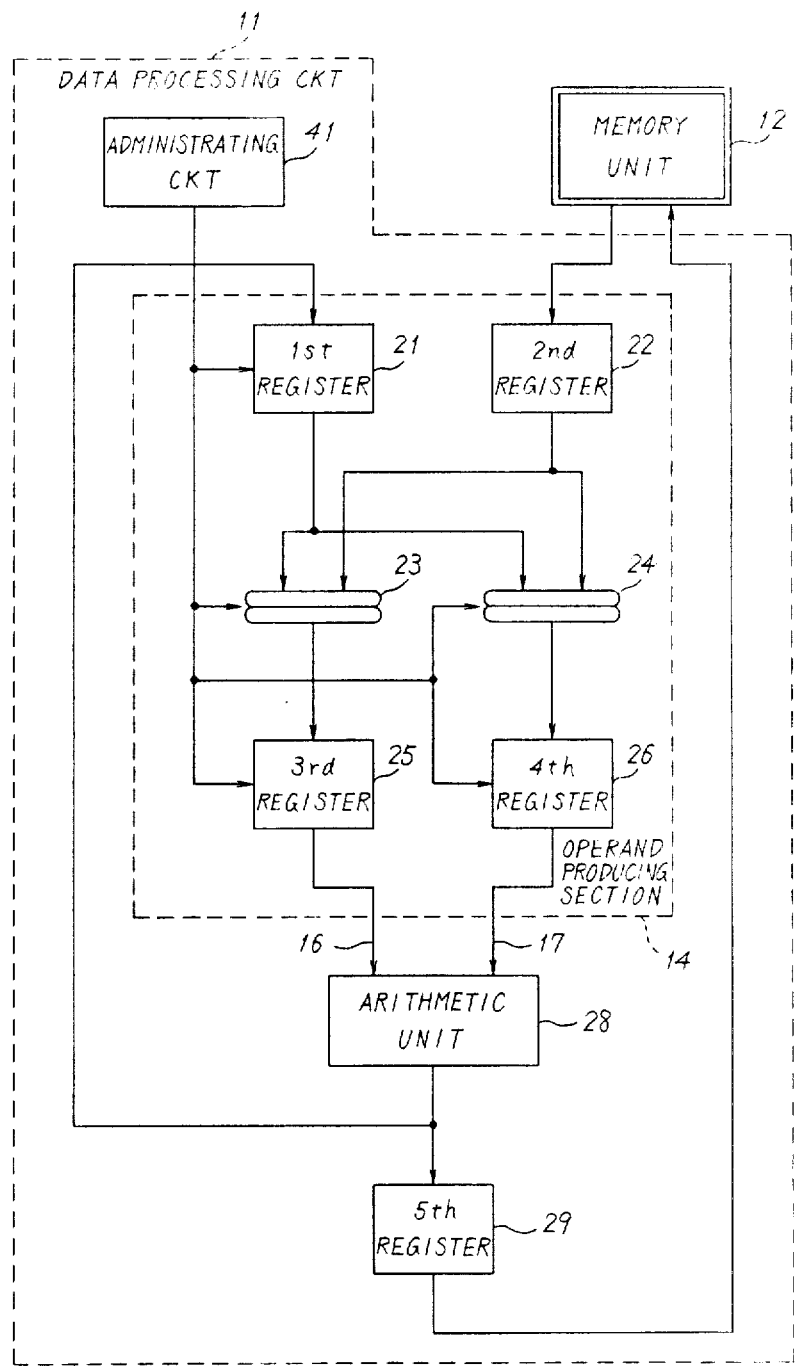
FIG. 6 shows in blocks, together with a memory unit, a data processing circuit according to a second embodiment of this invention.

Referring to FIG. 6, a data processing circuit 11 according to a second embodiment of this invention comprises similar parts which are designated again by like reference numerals. The data progressing circuit 11 also comprises first and third registers 21 and 25 which are operated like a pipeline as will become clear. However, the first and the third registers 21 and 25 are furthermore operable as work registers which are for successively temporarily storing intermediate results sent from an arithmetic unit 28. It is to be noted here that the work registers 21 and 25 do not fixedly correspond to the first and the second work registers 31 and 32 illustrated in FIG. 4, respectively. Instead, each of the work registers 21 and 25 is operable as any one of the first and the second work registers 31 and 32 illustrated in FIG. 4.

The data processing circuit 11 further comprises an administrating circuit 41 which is for administrating the work registers 21 and 25 to cyclically transfer the intermediate results among the work registers 21 and 25 and the arithmetic unit 28 in a pipeline fashion. The administrating circuit 41 operates when the registers 21 and 25 are also used as the work registers. The administrating circuit 41 comprises a specifying section which is for specifying the registers 21 and 25 as the work registers and for controlling operations of the registers 21 and 25 specified as the work registers. The specifying section also controls operations of first and second selectors 23 and 24 and a fourth register 26.

Figure 7:
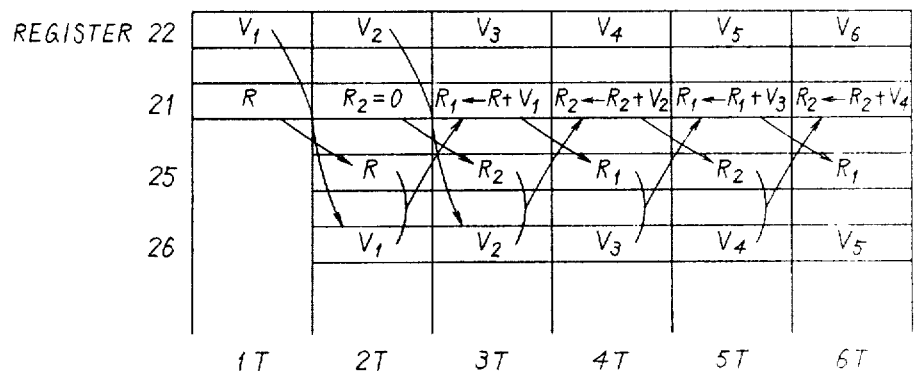
FIG. 7 is a time chart for use in describing the data processing circuit according to the second embodiment of this invention.

Referring to FIG. 7 afresh and FIG. 6 again, operation of the data processing circuit 11 will now be described as regards a case where an instruction to be executed is a vector instruction which is represented by Formula (1) described above. The vector instruction is executed in accordance with a sequence of arithmetic steps represented by Formulae (5) described before. In FIG. 7, a machine cycle is once again represented by T.

In a first machine cycle 1T, an initial value R and a first vector element $V_1$ are stored in the first and the second registers 21 and 22, respectively.

In a second machine cycle 2T, the initial value R and the first vector element $V_1$ are stored in the third and the fourth registers 25 and 26 through the first and the second selectors 23 and 24, respectively, under control of the administrating circuit 41. Simultaneously, a second vector element $V_2$ is stored in the second register 22. At the same time, another initial value $R_2 = 0$ is stored in the first register 21 operated like the second work register 32 (FIG. 4) under control of the administrating circuit 41.

In a third machine cycle 3T, a first local sum of the initial value R and the first vector element $V_1$ is calculated by the arithmetic unit 28. A first intermediate result $(R + V_1)$ representative of the first local sum is stored in the first register 21 (namely, an $R_1$ register) like the first work register 31 (FIG. 4) under control of the administrating circuit 41. At the same time, the other initial value $R_2 = 0$ is stored in the third register 25 through the first selector 23 under control of the administrating circuit 41. Thus, the third register 25 serves as the second work register 32 (FIG. 4) which is for holding a content of an $R_2$ register for the purpose of obtaining an ultimate result. Simultaneously, a third vector element $V_3$ is stored in the second register 22. The second vector element $V_2$ is stored in the fourth register 26 through the second selector 24 under control of the administrating circuit 41.

In a fourth machine cycle 4T, a second local sum of the other initial value $R_2 = 0$ and the second vector element $V_2$ is calculated by the arithmetic unit 28. A second intermediate result $(R_2 + V_2)$ representative of the first local sum is stored in the first register 21 (namely, the $R_2$ register) serving as the second work register 32 (FIG. 4) under control of the administrating circuit 41. Simultaneously, the first intermediate result $(R + V_1)$ is stored in the third register 25 through the first selector 23 under control of the administrating circuit 41. Thus, the third register 25 serves as the first work register 31 (FIG. 4) which is for holding a content of the $R_1$ register for the purpose of obtaining the ultimate result. Simultaneously, a fourth vector element $V_4$ is stored in the second register 22. The third vector element $V_3$ is stored in the fourth register 26 through the second selector 24 under control of the administrating circuit 41. Thus, it is possible to carry out each of calculations $R + V_1 \rightarrow R$, $R_2 + V_2 \rightarrow R_2$, $R_1 + V_3 \rightarrow R_1$,

....

and $R_2 + V_n \rightarrow R_2$ every one machine cycle like in the data processing circuit 11 illustrated in FIG. 4.

As mentioned before, an intermediate result $(R_1 = R + V_1 + V_3 + ...)$ is stored in one of the registers 21 and 25 which serve as work registers. Simultaneously, another intermediate result $(R_2 = V_2 + V_4 + ...)$ is stored in the remaining one of the registers 21 and 25.

After calculation is carried out as regards a final vector element $V_n$, a calculation of $R_1 + R_2 R$ is carried out as follows.

At first, a content (one of the values $R_1$ and $R_2$) of the first register 21 is stored in the fourth register 26 through the second selector 24 under control of the administrating circuit 41. After that, the content of the fourth register 26 and another content (the remaining one of the values $R_1$ and $R_2$) of the third register 25 are added to each other by the arithmetic unit 28. As a result, the arithmetic unit 28 produces an ultimate result $(R_1 + R_2)$. The ultimate result is stored in the first register 21, namely, an R register, under control of the administrating circuit 41. Thus, a calculation of $$R + \sum_{i=1}^{n} V_i \rightarrow R$$

is carried out.

Inasmuch as an execution cycle of each vector element is substantially equal to one machine cycle on calculating a total sum of a series of vector elements, it is possible to calculate the total sum at a high speed.

In FIG. 6, first and third registers 21 and 25 serves as the work registers. The first and the third registers 21 and 25 constitute a pipeline in the operand producing section 14. Registers which constitute such a pipeline may be referred to as component registers. If the number m of pipeline stages is greater than two in the operand producing section 14, such a pipeline is composed of the component registers which are greater than two in number. In such a case, all of the component registers serve as the work registers under control of the administrating circuit 41.

While the present invention has thus far been described in conjunction with a few preferred embodiments thereof, it will now be readily possible for those skilled in the art to practice this invention in various other manners. For example, this invention may be applicable to a data processing circuit for use in calculating a total product of a succession of data. When the succession of data is represented by $V_i (i=1, 2, \ldots)$, the total product is represented by $$\prod_{i=1}^{n} V_i.$$

In such a case, the arithmetic unit 28 may be for carrying out a multiplication iteratively on the data of the succession.

What is claimed is:

1. A data processing circuit for use in a scalar machine in combination with memory unit to process each of a plurality of instructions through a plurality of pipeline stages in a pipeline fashion, said instructions including an iterative calculation instruction for carrying out an interactive calculation and a scalar instruction for carrying out a scalar calculation, said interactive calculation instruction being used for successively accessing said memory unit to read at least one operand, said iterative calculation being divisible into first through last partial calculations which are sequentially carried out at every pipeline stage by producing a sequence of output results successively appearing from an initial result to a final result during said first through last partial calculations, respectively, said data processing circuit comprising:

(a) calculation means operable in response to each of said instructions for selectively carrying out said iterative calculation to produce said output results during said partial calculations, respectively;

(b) calculation register means operatively connected to said calculation means for successively and temporarily storing each of the output results of said calculation means when said calculation means is operable in response to said iterative calculation instruction, said calculation register means comprising a plurality of registers operatively connected to said calculation means for defining the pipeline stages and a plurality of work registers cooperating with said plurality of registers and said calculation means and each having a work register function, said work registers storing the output results produced during different ones of said partial calculations, respectively;

(c) register administration means for administrating said plurality of the registers and said work registers for cyclically carrying out said successive and temporary storing of said output results through said pipeline stages; and (d) a calculation result register for storing said final result during said last partial calculation in accordance with said iterative calculation instruction.

2. A data processing circuit as claimed in claim 1, further comprising:

selector means coupled to said register administration means and said calculation register means for selecting one of said calculation register means under control of said register administration means to make said calculation means successively carry out said iterative calculation.

3. A data processing circuit as claimed in claim 2, wherein:

said register administration means is operable to successively supply a selected one of said calculation register means with a storage command for storing each of said output results and to cyclically supply said selector means with a selection command for selecting one of said calculation register means.

4. A data processing circuit as claimed in claim 1, wherein said number of work registers is equal to the number of the pipeline stages carried out in said data processing circuit.

5. A data processing circuit as claimed in claim 1, wherein said iterative calculation instruction is a vector instruction.

* * * * *